May 30, 1933.   R. T. HASLAM   1,912,136
PROCESS FOR OBTAINING LOW BOILING DISTILLATES
FROM HEAVY CARBONACEOUS MATERIAL
Filed Jan. 6, 1930
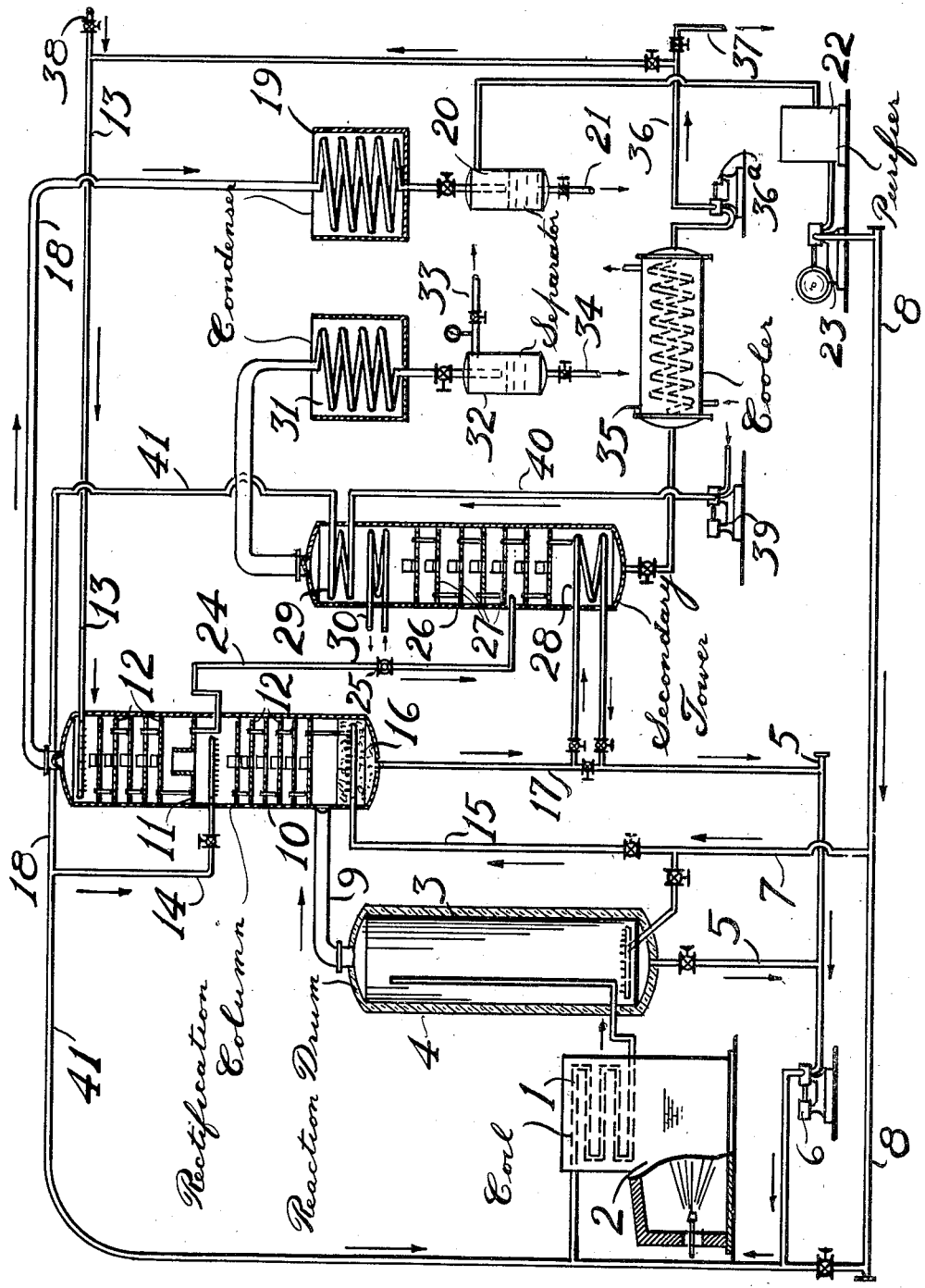
INVENTOR
Robert T. Haslam
BY
ATTORNEY Patented May 30, 1933

1,912,136

UNITED STATES PATENT OFFICE

ROBERT T. HASLAM, OF WESTFIELD, NEW JERSEY, ASSIGNOR TO STANDARD-I. G. COMPANY

PROCESS FOR OBTAINING LOW-BOILING DISTILLATES FROM HEAVY CARBONACEOUS MATERIAL

Application filed January 6, 1930. Serial No. 418,749.

The present invention relates to improvements in the production of low boiling from higher boiling or even solid carbonaceous materials by the action of heat and hydrogen under high pressure. My improved process will be fully understood from the following description and the drawing which illustrates one form of apparatus suitable for accomplishing it.

The drawing is a semi-diagrammatic view in sectional elevation of an apparatus constructed according to my invention and indicates the flow of materials.

Referring to the drawing, numeral 1 denotes a suitable heating means such as a fired coil arranged in a furnace setting 2 and capable of raising a stream of oil or the like to a temperature in excess of 900° F. The coil discharges into a reaction drum 3 which is protected against loss of heat by a suitable insulating cover 4 or by other means. The drum is adapted to withstand pressure in execess of 200 atmospheres and the effect of oil and hydrogen at such pressure and at high temperature. The reaction chamber may be agitated by any suitable means (not shown). Liquid material is withdrawn from the base of drum 3 and recirculated by line 5 and pump 6 to the inlet of coil 1 to maintain temperature in drum 3.

Hydrogen or a gas rich in free hydrogen is forced into drum 3 either by way of coil 1 or directly by line 7 or preferably by both of these means from a high pressure manifold 8. The vapor from drum 3 escapes by vapor line 9 to the lower part of a rectification column 10. The column is divided by a transverse plate 11 which allows vapor to rise and which permits trapping off of liquid condensate formed there above. Space above and below plate 11 is fitted with suitable fractionation means such as bell cap plates 12 as shown. The tower may be cooled in any suitable manner and pipes 13 and 14 respectively are arranged at the top of the tower and just below plate 11 respectively for introduction of liquid as will be described below. A small quantity of hydrogen may be added to the base of tower 10 by line 15 from manifold 8 and catalytic material 16 to be described below may be placed in the lower part of column 10 in coarse lump form. Reflux from the base of tower 10 flows by line 17 to recirculation line 5.

Gas and some light vapor flows from the top of tower 10 by line 18 to condenser 19 and separator 20. Condensate is withdrawn by line 21 to storage (not shown) and the gas under high pressure is returned to manifold 8 after purification at 22 and recompression by pump 23. The purification system may comprise any suitable system such as an oil scrubbing tower which is capable of substantially removing hydrogen sulphide and hydrocarbons.

A side stream is withdrawn from tower 10 by line 24 just above the plate 11. Line 24 is provided with a pressure reduction valve 25 and discharges into a secondary tower 26 which may also be fitted with bell cap plates 27 or the like. A heating coil 28 is provided in the base and may be heated by oil from line 17 as shown or by the oil discharged from coil 1 or by other satisfactory means. Cooling coils 29 and 30 are provided in the upper part of the tower for refluxing. Vapor is taken overhead to condenser 31 and separator 32, from which gas is vented by line 33. Liquid is withdrawn by line 34 to storage (not shown).

Oil withdrawn from the base of tower 26 is cooled in cooler 35 and a part thereof or all may be circulated by line 36 and pump 36ᵃ to the top of column 10 into which it is introduced by line 13 as noted above. The oil or part of it may be withdrawn to storage (not shown) by line 37 and fresh oil added by line 38.

Heavy oil fed to the system for destructive hydrogenation is forced in by pump 39 through line 40, coil 29 and thence by line 41 to the inlet of coil 1. Part of the oil is introduced into column 10 by means of line 14 as indicated above.

In the operation of my process heavy oil such as crude, reduced crude or other residues to which solids, such as ground coal, lignite and the like may be added are maintained in drum 3 at temperature in excess of 700° F. and preferably from 750 to 870° F. under high hydrogen pressure. The pressure is above 20 atmospheres and is preferably above 100 or 200 atmospheres. Catalysts such as oxides of chromium, tungsten, molybdenum and the like are used either alone or in admixture with each other or with other materials as well, such as alumina, zinc oxide, magnesia or rare earths oxides. The catalyst may be packed in drum 3 in lump form but is preferably finely ground and suspended in the oil. The volume of hydrogen circulated is usually in excess of 3,000 cu. ft. per barrel of oil although this is more than actually combines with the carbonaceous material.

Vapor from drum 3 contains light oil of the gasoline range together with heavier oils boiling up to 600° F. for example or higher. It is desirable to return such heavier oils to the destructive hydrogenation zone for further light oil formation. For this purpose the vapors are washed with the fresh oil being fed to the system so as to absorb the heavier oils and to allow the fractions boiling below about 400° to escape undissolved. This is easily regulated by carefully controlling the quantity and temperature of the feed oil admitted to the tower. Catalytic material similar to that used in drum 3 may be placed in the tower in lump form, if desired.

The vapor comprising fractions boiling below about 400° F. together with gas is removed to another absorption tower or to the upper part of the same tower as is shown in the drawing. This tower may be operated in any one of several different ways. For example, oil such as heavy naphtha, kerosene or the like is fed through line 13 in quantity sufficient to dissolve substantially all of the easily liquefiable hydrocarbons including or excluding butane as desired. The gas escaping is then cooled, purified and recompressed for reuse. The liquid is discharged into tower 26 which is maintained at a lower pressure than the previous part of the system, say up to 50 or 75 pounds per square inch. The fractions boiling up to about 400° are removed and condensed as a cut which is free of low boiling hydrocarbons such as propane, ethane and the like.

As a second method of operation, the quantity and temperature of the oil introduced by pipe 13 may be adjusted so as to dissolve not only the heavier fractions but also permanent gas hydrocarbons and hydrogen sulphide. The gas escaping need not be purified further and may be recompressed and recirculated. In this case, tower 26 is preferably operated at pressure somewhat higher, say from 75 to 250 pounds per square inch so that undesirable light products including butane and those boiling below butane may be removed, if desired. In this case, the fractions boiling up to 400° F. may then be topped off in suitable apparatus (not shown) and the residue returned for further obsorption in tower 26. It is of especial advantage to use as the solvent a hydrocarbon such as heavy naphtha which contains no fractions boiling above say 400° F. and in such case the product need not be redistilled but is suitable for use as a motor fuel after an alkali wash.

My invention is not to be limited by any theory of the mechanism of the process nor to any particular method of carrying it out but only by the following claims in which I wish to claim all novelty inherent in the invention.

I claim:

1. In a process for the destructive hydrogenation of heavy fluid carbonaceous material in which such material is subjected to the action of free hydrogen at temperature between 700 and 870° F. under pressure in excess of 20 atmospheres, the improved method of recovering unused free hydrogen from the vapors evolved in the hydrogenation which contains substantial quantities of free hydrogen which comprises directly contacting the hot vapors while under the full pressure of the reaction first with a high boiling hydrocarbon oil whereby the heavier normally liquid hydrocarbons are condensed, then with a lower boiling oil whereby lighter normally liquid hydrocarbons are condensed, and removing the remaining uncondensed gas which consists largely of free hydrogen.

2. Process according to claim 1 in which the heavy carbonaceous material is subjected to the action of hydrogen in the presence of a catalytic material which promotes the hydrogenation, and in which the vapors are washed with hydrocarbon oil in the presence of a mass of the same or a different hydrogenating catalytic material.

3. Process according to claim 1 in which the lower boiling hydrocarbon wash oil containing absorbed vapors is fractionated under a pressure between 50 and 250 pounds per square inch, a distillate suitable for motor fuel is recovered therefrom, and the residual oil is recompressed and returned to the high pressure washing step.

4. In a process for destructively hydrogenating high boiling hydrocarbon oil in which such oil is subjected to the action of a gas rich in free hydrogen at temperatures between 700 and 870° F., under pressure of about 200 atmospheres and in the presence of a catalytic material, the improved method of recovering free hydrogen from the vapors evolved in the hydrogenation which are rich in free hydrogen which comprises directly contacting the hot vapors while under the full pressure of the reaction, first with the entering high boiling hydrocarbon feed oil, then with a lower boiling hydrocarbon oil having a final boiling point not substantially greater than that of the desired low boiling product, removing the gas remaining unabsorbed and separately substantially purifying this gas of constituents other than hydrogen.

5. Process according to claim 4 in which the temperature and quantity of the lower boiling hydrocarbon wash oil are regulated to absorb substantially all of the low molecular weight hydrocarbons and impurities such as hydrogen sulphide, and the remaining gas comprising substantially pure hydrogen is recirculated directly to the hydrogenation reaction.

ROBERT T. HASLAM.